United States Patent [19]
Park

[11] Patent Number: 5,459,749
[45] Date of Patent: Oct. 17, 1995

[54] MULTI-LEVEL SUPERPOSED AMPLITUDE-MODULATED BASEBAND SIGNAL PROCESSOR

[75] Inventor: Il-keun Park, Suwon, Rep. of Korea

[73] Assignee: Samsung Electronics Co., Ltd., Suwon, Rep. of Korea

[21] Appl. No.: 172,198

[22] Filed: Dec. 23, 1993

[30] Foreign Application Priority Data

Aug. 31, 1993 [KR] Rep. of Korea .................. 93-17530

[51] Int. Cl.$^6$ .................................................. H04L 25/34
[52] U.S. Cl. .................. 375/286; 375/298; 375/300; 375/264; 375/268; 332/103; 332/115; 332/149; 341/56; 341/68; 341/144; 327/141; 327/354; 327/355
[58] Field of Search ................... 375/39, 17–20, 375/60, 62, 67, 41, 261, 264, 286–294, 298, 300, 303, 268; 332/103, 106, 115, 149, 159; 341/56, 68, 144; 328/60

[56] References Cited

U.S. PATENT DOCUMENTS

| | | | |
|---|---|---|---|
| 4,339,724 | 7/1982 | Feher et al. | 328/164 |
| 4,618,941 | 10/1986 | Linder et al. | 375/17 |
| 4,644,565 | 2/1987 | Seo et al. | 376/60 |
| 4,757,519 | 7/1988 | Collison et al. | 375/17 |
| 5,230,008 | 7/1993 | Duch et al. | 375/19 |
| 5,237,292 | 8/1993 | Chethik | 375/39 |
| 5,265,127 | 11/1993 | Betts et al. | 375/39 |

Primary Examiner—Stephen Chin
Assistant Examiner—Amanda T. Le
Attorney, Agent, or Firm—Foley & Lardner

[57] ABSTRACT

A multi-level superposed amplitude-modulated baseband signal processor which has simple hardware structure and a filtering effect for bandwidth and power efficiency in a digital transmission system includes a data delayer, a signal level converter, an operator, two pulse generators, two adders and two amplifiers, thereby eliminating the need for conventionally required pulse waveforms and simplifying circuit structure. Specifically, when the number of the multi-levels is desired to be changed, the relevant multi-level superposed amplitude-modulated baseband signal can be provided by a simple change of the processor.

3 Claims, 6 Drawing Sheets

MULTI-LEVEL SUPERPOSED AMPLITUDE-MODULATED BASEBAND SIGNAL PROCESSOR

BACKGROUND OF THE INVENTION

The present invention relates to a digital data transmission system which can be applied to such communication systems as satellite, ground-based network, mobile and cable communications, and more particularly, to a multi-level superposed amplitude-modulated baseband signal processor which receives a non-return-to-zero (NRZ) data stream and generates an output having a narrow frequency bandwidth and small side lobes even in a non-linear channel.

As compared with existing analog communication methods, digital communication methods have high reliability and enable the transmission of high-quality information. Therefore, digital communication methods are forming the mainstream in modern information communication, and the use thereof has gradually been increasing. The carrier wave parameters, for example, phase and amplitude, are modulated and transmitted in accordance with the information data to be transmitted. Then, the transmitted parameters are demodulated in the receiving portion, to thereby restore the data.

In the digital modulator which changes the digital data into a form transmittable via the proposed transmission channel, the modulator's performance is evaluated by the characteristics of bandwidth efficiency and electrical power efficiency.

The need for bandwidth-efficient digital modulation methods are increasing so that larger quantities of information may be processed in the restricted frequency resource environment, wherein adjacent carriers interfere with each other in densely used transmission channels.

Accordingly, when pure digital data is transmitted without any change, the bandwidth is wide. Therefore, in general, the input data is modulated and transmitted after limiting the bandwidth through filtering or other means.

In addition, good bandwidth efficiency can be obtained by gathering and transmitting a number of input data bits at one time in a single symbol unit selected among the symbols of a modulation signal. That is, a single symbol is formed by the input data being divided into bit groups consisting of k bits. When the data consisting of k bits is modulated so that the amplitude or degree of phase change is in proportion to $2^k$, which is the number of cases which k-bit data can express, a large amount of data can be transmitted even without extending the bandwidth on the power density spectrum. The reason for this is that the bandwidth is proportional to the symbol transmission speed, i.e., the reciprocal of the data symbol cycle, and remains unaffected by changes in amplitude or phase. This is called multi-level modulation.

The present invention aims to obtain a bandwidth-efficient modulation signal in a digital transmission system, and more particularly, to provide the function of generating a filtered and multi-level modulated baseband signal.

As a widely used modulation scheme for digital data transmission systems, the phase-shift-keying (PSK) and pulse amplitude modulation (PAM) methods respectively modulate the phase or amplitude of a carrier wave in accordance with the input data of binary code. If a single input data of binary code is modulated by being corresponded to a single phase, this is called binary phase-shift-keying (BPSK).

Further, a modulation method wherein two signals by the BPSK modulation are disposed to be divided into an in-phase and a quadrature-phase on the signal space, is called quadrature phase-shift-keying (QPSK). At this time, the input data corresponding to a phase of the single carrier wave is two-bit data.

Accordingly, when the same quantity of the data is transmitted, the bandwidth on the power density spectrum occupied by the QPSK signal is half that of the BPSK signal. Expressed another way, the QPSK method can transmit twice the information of the BPSK method, in the same bandwidth. Thus, a bandwidth-efficient modulation method, for example, 8-PSK or 16-PSK, is introduced.

In PAM, a symbol point for representing the multi-level amplitude of input symbols as described above, is located on the signal space. Then, multi-level quadrature amplitude modulation (QAM) signal is obtained by corresponding the symbol point to the multiple-bit input data.

As described above, the information transmitted by a single symbol in a single signal space increases as the degree of the multi-level becomes higher, which results in a more bandwidth-efficient modulation method.

Meanwhile, when the data input from the modulation methods described above is modulated and transmitted, the modulation signal occupies a very wide bandwidth. Therefore, before transmission, the bandwidth of the modulation signal is limited to maintain high performance.

Here, a method which forms and then transmits a bandwidth-limited signal using a raised-cosine filter which satisfies the Nyquist theory, is generally used. However, when a high-power amplifier is operated in a non-linear region, i.e., in saturation, for more power-efficient transmission, the side lobes are spread, which, as widely known, results in serious adjacent channel interference.

In addition, jitter, i.e., a time difference generated when the signal passes the zero level, increases as the bandwidth is limited, thereby causing difficulties in restoring the timing of the symbol in a demodulator.

Power and bandwidth-efficient digital signal transmission systems for preventing the above phenomenon are disclosed in U.S. Pat. No. 4,339,724 by Dr. K. Feher and U.S. Pat. No. 4,644,565 by Dr. J. S. Seo.

Signals generated by the above patents produce two pulse shapes which correspond to a single bit of the input data stream, which is a NRZ-shaped binary code. The signals of the produced pulse shapes, that is, a double-interval raised-cosine pulse and a common raised-cosine pulse, are superposed according to the ratio of the superposition (signal "A⇌ of FIG. 1) and then output via an output terminal. As a result, a superposed modulation baseband signal is generated, which minimizes amplitude fluctuation.

Accordingly, only slight re-growth of the side lobes occur and the possibility of error is low even when the superposed modulation signal where the superposed modulation baseband signal is used, that is, the modulated carrier obtained using the above superposed modulation baseband signal is amplified via a non-linear amplifier and transmitted via a communication channel. Therefore, a bandwidth-efficient and power-efficient modulation signal can be obtained while the inter-symbol interference (ISI) between the jitter and the code of the transmitting terminal does not occur.

Especially, in the invention by Dr. J. S. Seo, the main lobe bandwidth and the side lobe amplitude in power density spectrum can be controlled by controlling the superposition (A), which means that a suitably controlled bandwidth for a digital transmission system is possible. Also, when the superposition (A) equals one, the modulated output signal is identical to that of the invention by Dr. K. Feher.

The technical field and the characteristic of the above two patents are similar. Therefore, the signals generated by the above patents are called "superposed amplitude modulated baseband signals."

Different than the conventional filter which comprises a resistor, inductor, capacitor and an operational amplifier due to the characteristics of the superposed amplitude-modulated baseband signal, the devices of the inventions of the two patents for generating the superposed amplitude-modulated baseband signal use a non-linear method for obtaining the filtered and modulated signal. That is, devices of the inventions of the two patents generate a multitude of bandwidth-limited pulse waveforms corresponding to an output signal of the superposed amplitude-modulated baseband signal. Then, the pulse waveform selected among the pulse waveforms generated according to the pattern of the input data is output, to obtain a filtered and modulated signal.

Also, the inventions of the above patents generate a modulated signal from a single stream of input data, and are not multi-level amplitude modulation methods.

The impulse response characteristic y(t) is theoretically required to obtain the multi-level superposed amplitude modulation baseband signal, as follows.

$$y(t) = \sum_{n=0}^{\infty} [a_n s(t - nT_s) + a_{n+1} s(t - (n+1)T_s)] \quad (1)$$

Here, $a_n$ is the amplitude of the multi-level signal space expressed by the input data to a point in time n, and corresponds to one element of the group consisting of $\pm 1$, $\pm 3, \pm 5, \ldots, \pm (= \overline{M}-1)$, when the superposition number is M. In addition, s(t) is a baseband signal impulse response to the basic superposed amplitude-modulated signal, which is expressed as follows.

$$s(t) = \frac{1}{2} \left( 1 + \cos \frac{\pi t}{T_s} \right) - \frac{1-A}{2} \left( 1 - \cos \frac{\pi t}{T_s} \right) \quad (2)$$

where A is a superposed degree and $T_s$ is a symbol duration.

In order to obtain the baseband signal of the multi-level superposed amplitude modulation, the element that constitutes the baseband waveform when the superposed amplitude modulation signal is multi-level superposed amplitude-modulated is generated within the processor. Then, one selected from the pulse waveforms generated according to the input data form is output.

However, as the number of multi-levels increases, the required number of pulse waveforms also increases geometrically, and the process of selecting and outputting a pulse waveform among the pulse waveforms becomes more complicated, thereby increasing the complexity of the processor.

As another conventional method for obtaining the multi-level superposed amplitude modulation signal, there is a method wherein the impulse response of the multi-level amplitude-modulated baseband signal is sampled and a digital filter having the value of the sampled signal as its coefficient is used. This method also requires that, as the number of multi-levels increases, various digital filters be added in parallel in correlation to the multilevel increase. As a result, the constitution and complexity of the circuit is increased.

All of the conventional multi-level superposed amplitude-modulated baseband signal generating methods generate a superposed amplitude-modulated signal which has a predetermined number of multi-levels. Therefore, when the number of multi-levels is required to be changed for flexibility of transmission systems, some of the generated pulse waveforms have to be included or omitted according to the change.

To perform this task, since all of the elements of the circuits such as digital filters have to be changed according to the change in the number of multi-levels at the worst case, the conventional method excessively complicates changing the number of the multi-levels, and hence lacks flexibility.

As another method for changing the number of multi-levels in the conventional multi-level superposed amplitude baseband signal generating method, there is a method in which the pulse signals relevant to the required number of the multi-levels are provided in the processor first, and the pulse signal is selected and used according to the number of the required multi-levels. This method also entails a large and complicated circuit.

SUMMARY OF THE INVENTION

Accordingly, it is an object of the present invention to provide a multi-level superposed amplitude-modulated baseband signal processor which maintains the bandwidth and power efficiencies, i.e., the basic characteristics of a multi-level superposed amplitude-modulated signal, by a simple structure wherein a baseband pulse is utilized in the minimum superposed amplitude modulation, having eliminated the drawbacks of the conventional method which requires all the pulse waveforms corresponding to each multi-level superposed modulated output signal.

It is another object of the present invention to provide a multi-level superposed amplitude-modulated baseband signal processor which can provide a multi-level superposed amplitude-modulated baseband signal corresponding to the number of its multi-levels, by a simple change of the processor, when a change in the number of multi-levels is desired for better system flexibility.

It is still another object of the present invention to provide a multi-level superposed amplitude-modulated baseband signal processor which is applicable by simply changing the processor when the user wants to change the transmission speed of the input data and the value of the superposition degree (A) in the power density spectrum for system flexibility.

To accomplish the above objects, there is provided a multi-level amplitude-modulated baseband signal processor having:

data delaying means for receiving in parallel k-bit data constituting one symbol, and for delaying the k-bit data for one symbol cycle to output one-symbol-delayed data;

signal level converting means for respectively receiving the k-bit data and the one-symbol-delayed data, converting the respectively received data into amplitude values selected among an amplitude set whose size is $2^k$ in the space of the multi-level superposed amplitude modulation signal expressed by the symbol, and outputting the resultant amplitude value;

operating device for respectively receiving the output signals of the signal level converting means and data delaying means and outputting signals B, C, D, E and F which are defined as $$B = \frac{|S3 - S4|}{2}$$

$$C = sgn\ (S3 - S4)$$

$$D = \frac{S3 + S4}{2}$$

$$E = |S3 + S4|$$

$$F = sgn\ (S3 + S4)$$

Wherein, sgn(x) means sign of x, and |y| means absolute value of y during the relevant single symbol cycle, given that the output of the signal level converting means is S3 and the output of the data delaying means is S4;

a first pulse generator which repeatedly generates a cosine wave signal which is synchronized with the basic symbol clock of the input data stream and shaped as $\cos\{(\pi t)/T\}$, for the symbol cycle period (T);

first selecting means for respectively receiving the output signal of the first pulse generator and the inversion of the output signal of the first pulse generator and selecting between the respectively received output signals in accordance with the output signal C from the operating device;

a first amplifier for amplifying the first selected signal from the first selecting means, whose gain is controlled by the output signal B from the operating device;

a first adder which sums the output signal of the first amplifier and the output signal D, and outputs the result;

a second pulse generator which repeatedly generates a cosine wave signal which is synchronized with the basic symbol clock of the input data stream and shaped as $0.5(1-A)(1-\cos\{(2\pi t)/T\})$, for the symbol cycle period (T) according to the degree (A) of superposition;

second selecting means for respectively receiving the output signal of the second pulse generator and the inversion of the output signal of the second pulse generator and selecting between the respectively received output signals in accordance with the output signal F from the operating device;

a second amplifier for amplifying the second selected signal from the second selecting means, whose gain is controlled by the output signal F from the operating device; and a second adder which sums the outputs of the first adder and the second amplifier, thereby resulting in the output signal according to the present invention.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

The present invention will be described below in more detail with reference to the attached drawings.

Figure 1:
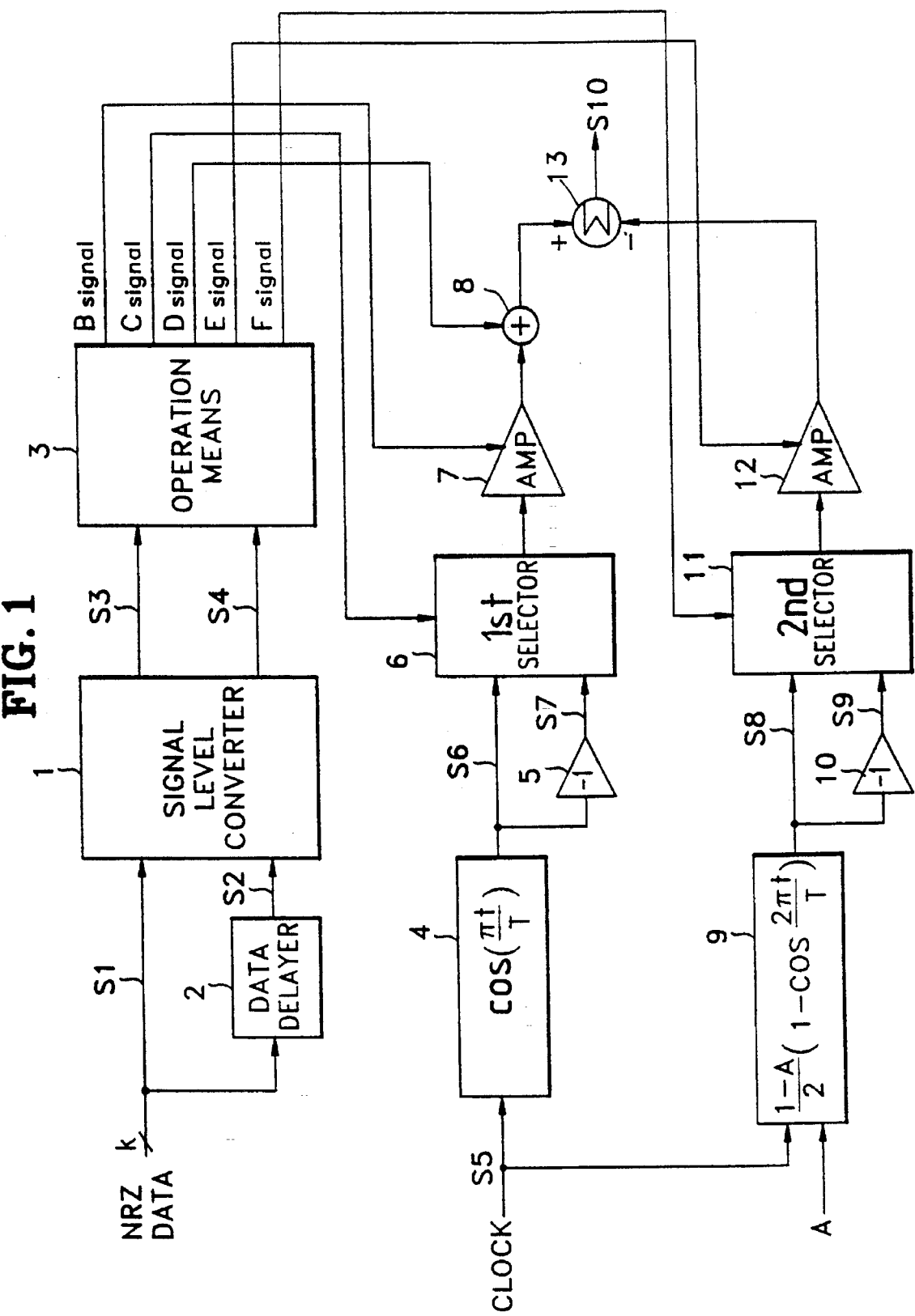
FIG. 1 is a block diagram showing the structure of a multi-level superposed amplitude-modulated baseband signal processor according to the present invention.

FIG. 1 is a structural diagram of multi-level superposed amplitude-modulated baseband signal processor according to the present invention. The processor includes a signal level converter 1, a data delayer 2, an operating device 3, a first pulse generator 4, a first inverter 5, a first selector 6, a first amplifier 7, a first adder 8, a second pulse generator 9, a second inverter 10, a second selector 11, a second amplifier 12 and a second adder 13.

NRZ data S1 to be transmitted consists of k bits and is connected to the input of signal level converter 1 and to the input of data delayer 2. Here, the data stream input to data delayer 2 is delayed for one symbol cycle and then, after being converted into a delay signal S2, is connected to another input of signal level converter 1.

The two groups of data S1 and S2 input to signal level converter 1 are respectively converted into the corresponding amplitude values S3 and S4 in the signal space to be output. The two output values S3 and S4 are respectively connected to the two inputs of the operating device 3.

The two voltage values input to operating device 3 yield the various signal components required for each operative element of the present invention. Specifically, output signal B is connected to the gain control terminal of first amplifier 7, output signal C is connected to the control terminal of the first selector 6, output signal D is connected to an input of first adder 8, output signal E is connected to the gain control terminal of the second amplifier 12, and output signal F is connected to a control terminal of the second selector 11.

Meanwhile, an input data basic symbol clock S5 is divided into two paths, where one is connected to the input of first pulse generator 4 and the other is connected to an input of second pulse generator 9.

First and second pulse generators 4 and 9 respectively generate the cosine waveform pulses $\cos\{(\pi t)/T\}$ and $0.5(1-A)(1-\cos\{(2\pi t)/T\})$ which are synchronized with symbol clock S5. These processors can be structured by the use of either a memory element or a bandpass filter. Here, the former is a method for outputting the desired signal as one which is synchronized with a symbol clock output from a memory for storing the sample values calculated by the above expressions, and the latter is a method for outputting the desired signal by extracting elements of the symbol signal via bandpass-filtering.

Output signal S6 is again divided into two paths, where one is connected to an input of first selector 6 and another is inverted via first inverter 5 and connected to the other input of first selector 6.

First selector 6 selects and outputs either of the two input signals according to the C signal provided by operating device 3. The selected output signal is then supplied to the input of first amplifier 7.

First amplifier 7 amplifies the input signal according to output signal B, which is a gain control voltage provided by operating device 3. The amplified input signal is supplied to an input of first adder 8.

First adder 8 sums the output of first amplifier 7 and the output signal D provided by operating device 3 and provides the result to an input of second adder 13.

Meanwhile, output signal S8 of second pulse generator 9 is divided into two paths, of which one side is connected to an input of second selector 11 and another side is inverted by second inverter 10 and connected to another input of second selector 11.

Second selector 11 selects either of the two input signals depending on the output signal F provided by operating device 3, and the output signal is provided to the input of second amplifier 12.

Second amplifier 12 amplifies the input signal depending on the output signal E, i.e., a gain control voltage, provided by operating device 3, and the amplified output signal is supplied to the other input of second adder 13.

Second adder 13 sums the outputs of second amplifier 12 and first adder 8, and outputs the final output signal S10 of the present invention.

The present invention will be explained in more detail in terms of its operation with reference to FIGS. 1, 2 and 3.

For the convenience of understanding, the case of generating the baseband signal required for a four-level (2-bit) superposed modulation signal is explained as an example. Here, the two bits are input as the NRZ data S1 during one symbol cycle, and the multi-level amplitude-modulated baseband signals corresponding to the four symbols in the signal space are output.

In the example, when the value of the output signal C from operating device 3 is greater than zero, first selector 6 is designed to select and output the output signal S7 of first inverter 5, and otherwise (C<0), to select and output the output signal S6 of first pulse generator 4. Also, when the value of the output signal F from operating device 3 is greater than zero, second selector 11 is designed to select and output the output signal S9 of second inverter 10, and otherwise (F<0), to select and output the output signal S8 of second pulse generator 9. Further, the gain factors of first and second amplifiers 7 and 12 are designed to correspond to the voltage values of signals B and E, respectively. Accordingly, if the values of the output signals B and E are one and three respectively, then first and second amplifiers 7 and 12 amplify the input signals by factors one and three, respectively.

Figure 2:
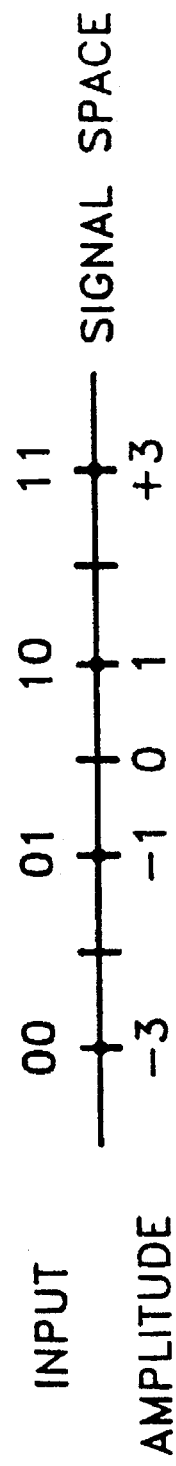
FIG. 2 is a linear graphical representation for the operation of the processor shown in FIG. 1 wherein four amplitudes are expressed by one symbol (given that the number of multi-levels is four) and disposed in the signal space.

FIG. 2 illustrates the operation of the device shown in FIG. 1. Here, the four amplitudes are disposed in the signal space when the number of the multi-levels (M) is 4. The disposition and the above assumptions are only for explanation and can be changed by the designer depending upon system requirements.

Figure 3:
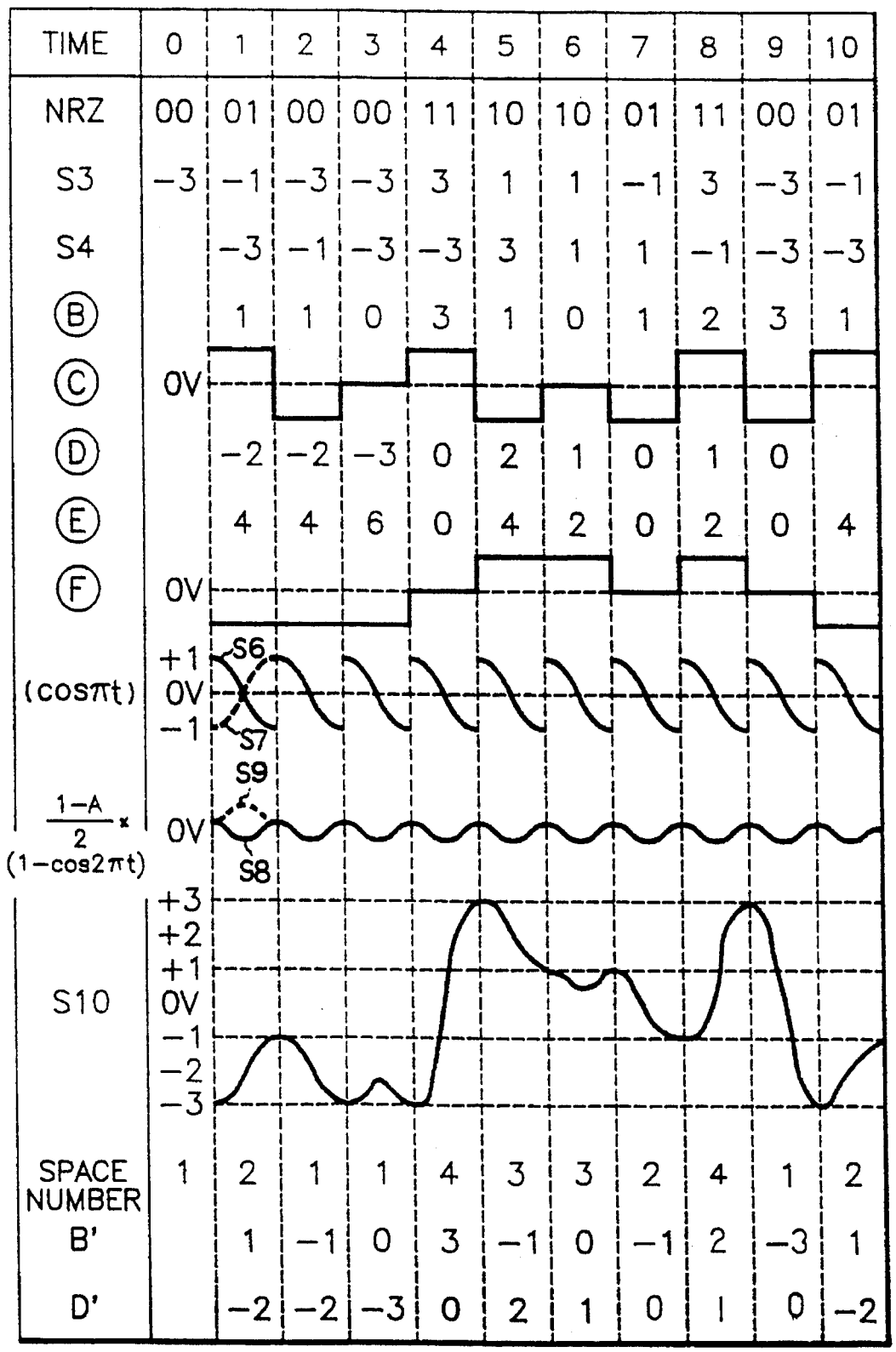
FIG. 3 is a table for explaining the case where the number of the multi-levels is four, showing the operation of the processor shown in FIGS. 1 and 6.

FIG. 3 shows waveforms for each part of the device according to the present invention, where the input NRZ data stream is input in the order of 00, 01, 00, 00, 11, 10, 10, 01, 11, 00, 01.

As is shown in the above example, the NRZ data S1 input by two bits per symbol period and the delayed data S2 in which the NRZ data is delayed for one symbol cycle by data delayer 2 are input to signal level converter 1. Then, signal level converter 1 outputs the signals S3 and S4 which are converted to the signal levels required for operating device 3.

Here, the levels of signals S3 and S4 are equal to the amplitudes corresponding to the NRZ data in the signal space.

Accordingly, as indicated in FIG. 3, the output signal S4 is identical to the output signal S3 for the previous symbol cycle.

The output signals S3 and S4 are provided to operating device 3 and operated as the following expressions (3) through (7). As a result, the control signal and voltage required for each part of the present invention can be obtained.

$$B = \frac{|S3 - S4|}{2} \quad (3)$$

$$C = sgn\,(S3 - S4) \quad (4)$$

$$D = \frac{S3 + S4}{2} \quad (5)$$

$$E = |S3 + S4| \quad (6)$$

$$F = sgn\,(S3 + S4) \quad (7)$$

For the number 1 as marked on the time axis of FIG. 3, that is, when the previous input data is "00" and the current input data is "01," the output signals S3 and S4 are −1 and −3, respectively. Therefore, the outputs of operating device 3 are:

$$B = \frac{|-1 + 3|}{2} = 1$$

$$C = sgn\,(-1 + 3) > 0$$

$$D = \frac{-1 - 3}{2} = -2$$

$$E = |-1 - 3| = 4$$

$$F = sgn\,(-1 - 3) < 0$$

Accordingly, first selector 6 receives the output signal C as a control signal, and selects $-\cos\{(\pi t)/T\}$, i.e., output signal S7 of first inverter 5 (per the above assumption), since the value of the C signal is greater than zero. The selected $-\cos\{(\pi t)/T\}$ is output to first amplifier 7.

In first amplifier 7, since the value of the output signal B, which is a gain control signal, is one, the input signal is amplified by a factor of one, which means that the input signal is directly transmitted to first adder 8.

In first adder 8, the output signal of first amplifier 7 and the output signal D provided by operating device 3 are summed. Here, with the value of the output signal D being negative two, the summed result is the signal S7 shifted to a voltage value of negative two.

Meanwhile, second selector 11 receives the output signal

F as a control signal. However, since the value of the output signal F is less than zero, output signal S8, which is expressed as $0.5(1-A)(1-\cos\{(2\pi t)/T\})$, is selected and output to second amplifier 12 (per the above assumption).

Since the value of output signal E, which is a gain control signal, is four, the input signal is amplified by a factor of four and transmitted to second adder 13.

In second adder 13, the output signal of first adder 8 which is the summation of the output signal of first amplifier 7 and the control signal D is supplied to a positive port, while a negative port of the second adder receives the output of second amplifier 12. The two inputs are summed such that the output of second amplifier is subtracted from the output signal of first adder, and then the four-level superposed amplitude-modulated baseband signal, i.e., S10 of the present invention, is output.

The four-level superposed amplitude-modulated baseband signal, shown as S10 of FIG. 3, is output for the following symbol cycles by the same operation as above.

When the number of multi-levels needs to be changed, the number (k) of bits constituting one symbol of data will be also changed. Thus, the amplitude level of the multi-level superposed amplitude-modulated baseband output signal according to the present invention generates one among $2^k$ amplitude levels, to enable the simple generation of the multi-level superposed amplitude-modulated baseband signal at the desired level.

The signal generated by the present invention is employed instead of the output signal of bandwidth limitation filter which exists in the in-phase channel and the quadrature phase channel of the offset quadrature amplitude modulation (OQAM) method processor. As a result, the 16-level superposed quadrature amplitude modulation (16-SQAM) signal is generated.

Figure 4:
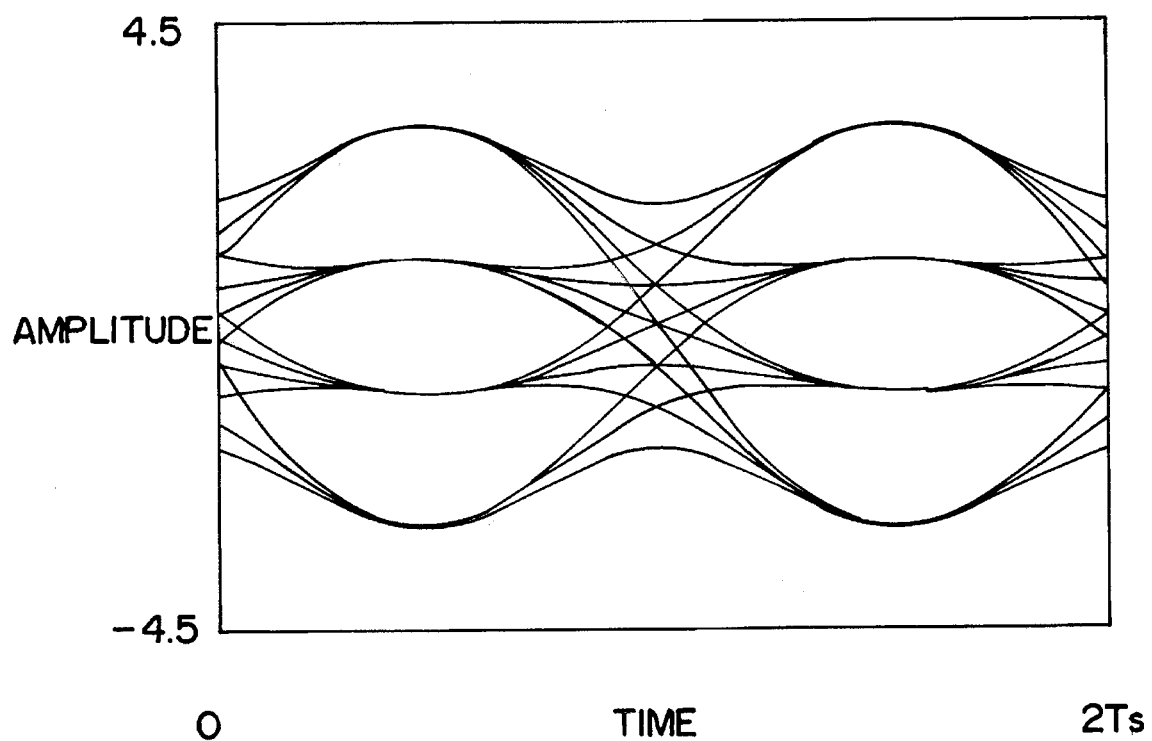
FIG. 4 is an eye pattern diagram representing the multi-level superposed amplitude-modulated baseband signal output of the processor shown in FIG. 1, when the number of the multi-levels is four and the degree of superposition is 0.8.

FIG. 4 is an eye pattern diagram of the four-level superposed amplitude-modulated baseband signal output when the number (M) of the multi-levels is four and the degree (A) of superposition is 0.8, as shown in FIG. 1. FIG. 4 correctly corresponds to the multi-level superposed amplitude-modulated baseband signal characteristic resulting from theoretical studies.

Figure 5:
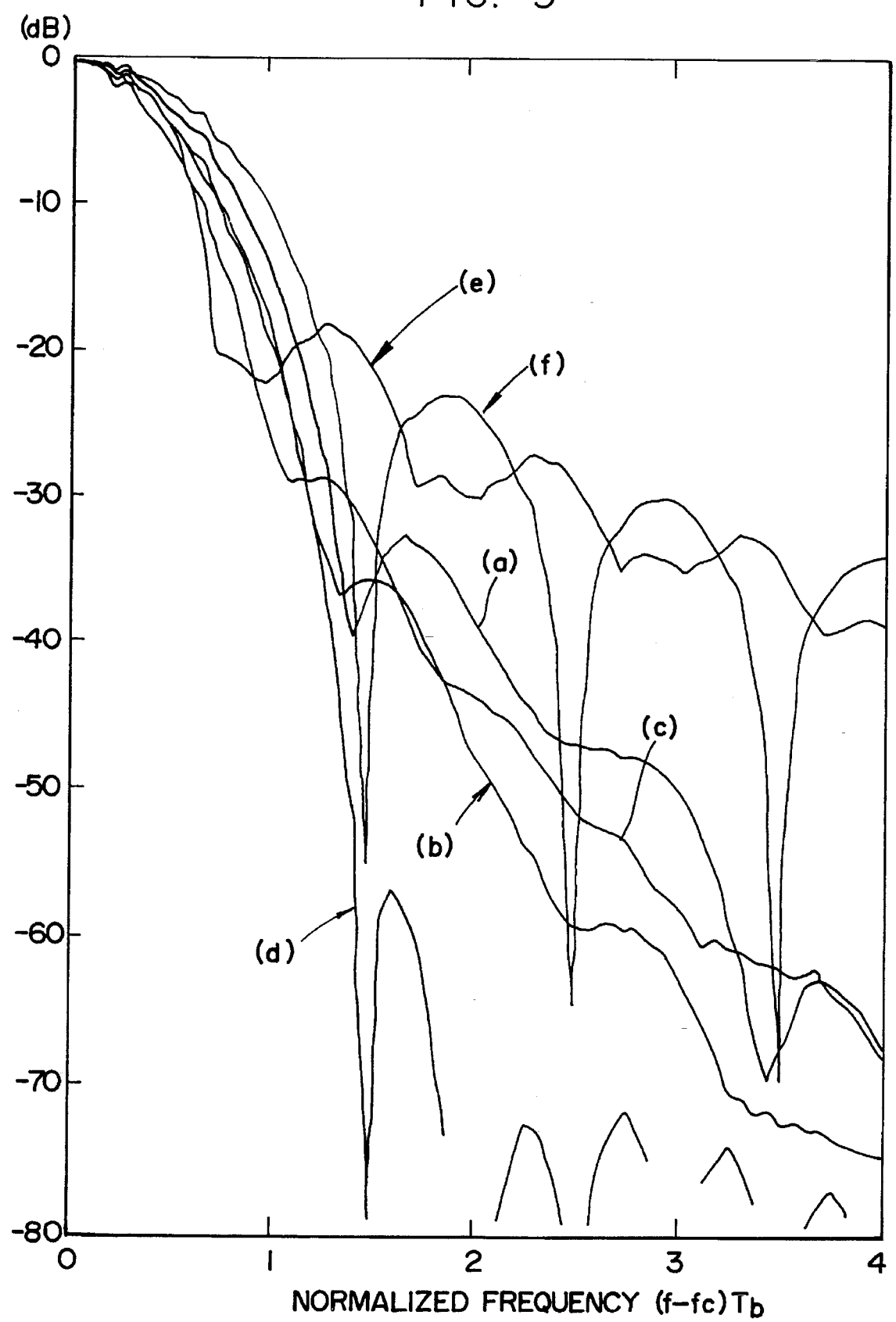
FIG. 5 is a power spectrum diagram of the multi-level superposed amplitude-modulated baseband signal output from the processor shown in FIG. 1, when the number of the multi-levels is four and the degree of superposition is 0.8.

FIG. 5 shows the comparison between other modulation methods and the present method in view of the power density spectrum normalized when the multi-level superposed quadrature amplitude modulation signal obtained by using the multi-level superposed amplitude-modulated baseband signal is amplified by an amplifier operating in the non-linear region. Also, the conditions of each spectrum shown in FIG. 5 are as follows:

(a) 16-SQAM with A=0.5 (non-linear channel)

(b) 16-SQAM with A=0.8 (non-linear channel)

(c) 16-SQAM with A=1.0 (non-linear channel)

(d) 16-SQAM with A=0.8 (linear channel)

(e) 16-QAM with α=0.5 (non-linear channel)

(f) MSK (non-linear channel) Here, α is the roll-off factor of a raised cosine type filter.

Also, f is the frequency of modulated signal, while $f_c$ is a carrier frequency and $T_b$ is bit duration.

As illustrated by FIG. 5, the normalized power density spectrum of the present invention has good characteristics where the bandwidth is narrower and the re-growth phenomenon of the side-lobe occurs less as compared with the minimum shift keying (MSK) method or with the multi-level quadrature amplitude modulation (MQAM) method having a raised-cosine filter.

Figure 6:
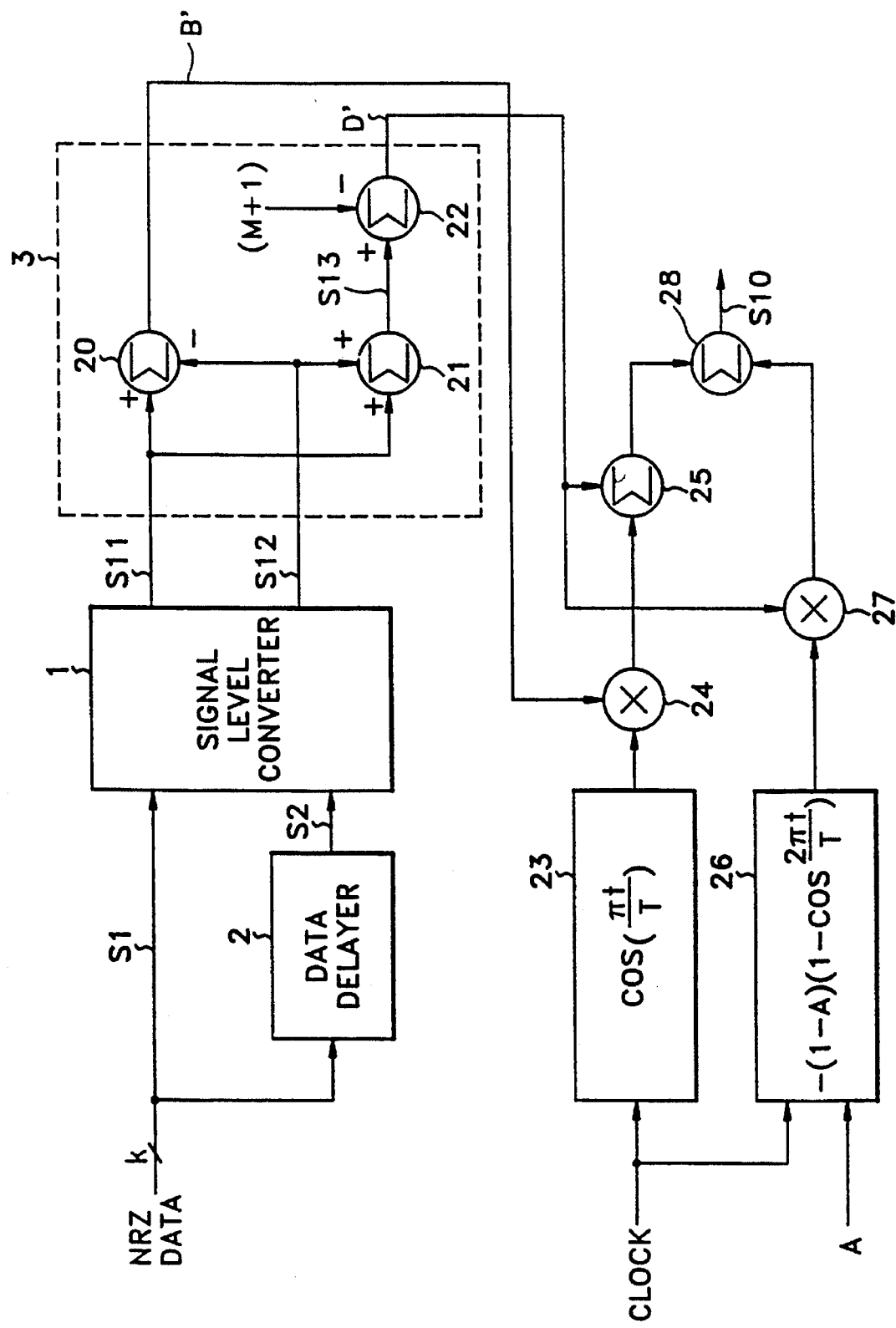
FIG. 6 is a block diagram showing a multi-level superposed amplitude-modulated baseband signal processor according to an embodiment of the present invention.

FIG. 6 is a block diagram showing a multi-level superposed amplitude-modulated baseband signal processor according to an embodiment of the present invention. The structure of the embodiment of the present invention will be explained with reference to FIG. 6.

NRZ data S1, being constituted of k bits which are to be transmitted, is supplied to the inputs of signal level converter 1 and delayer 2 through respective transmission paths. The data stream input to delayer 2 is delayed for one symbol cycle to form an output signal S2 which is connected to an input of signal level converter 1.

The two groups of data S1 and S2 input to signal level converter 1 are respectively converted into the output signals S11 and S12 which correspond to the amplitude values in the relevant signal space to be output, and the two output signals S11 and S12 are respectively connected to the two inputs of operating device 3.

The two output signals S11 and S12 input to operating device 3 yield the signal components required for each element of the present invention. However, in a first subtracter 20, the two output signals S11 and S12 are received and the difference value B' (S11–S12) between the two output signals is output and provided to an input of a first multiplier 24. Meanwhile, in a third adder 21, the sum of the two input signals, that is, output signal S13 (S11+S12), is provided to an input of a second subtracter 22. An externally provided M+1 value ("M" being the number of multi-levels) is supplied to another input of second subtracter 22. Then, the difference value D' between the two input signals, i.e., S13 -(M+1), is output and provided to the inputs of a fourth adder 25 and a second multiplier 27.

Meanwhile, the input data basic symbol clock S5 is divided into two paths, of which one is connected to an input of a third pulse generator 23 and the other is connected to an input of a fourth pulse generator 26.

The output of third pulse generator 23 is connected to an input of first multiplier 24, where the output signal B' from first subtracter 20 and the output of third pulse generator 23 are multiplied. The resulting product is provided to an input of a fourth adder 25.

In fourth adder 25, the signal provided by first multiplier 24 is input to one input and the output signal D' of second subtracter 22 is input to the other. Then, the sum value of the two inputs is output and supplied to an input of a fifth adder 28.

Meanwhile, the output of a fourth pulse generator 26 is provided to an input of second multiplier 27, where the output signal D' from second subtracter 22 and the output of fourth pulse generator 26 are multiplied. The resulting product is provided to an input of fifth adder 28.

In fifth adder 28, the signal provided by second multiplier 27 is connected to one input, and the output signal of fourth adder 25 is connected to the other, to output the sum value of the two inputs. As a result, the final output signal S10, i.e., the multi-level superposed modulated baseband signal of the present invention, is output.

Figure 7:
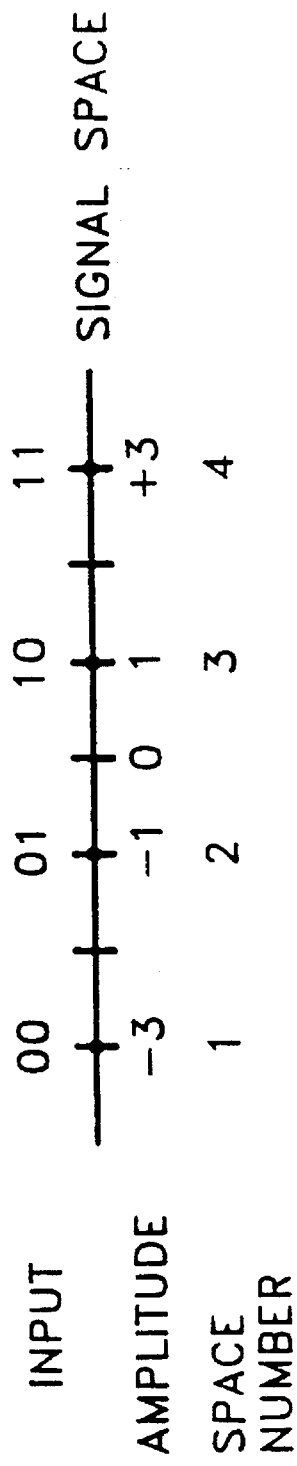
FIG. 7 is a linear graphical representation of the operation of the processor shown in FIG. 6 wherein four amplitudes and space numbers are expressed by one symbol (given that the number of multi-levels is four) and disposed in the signal space.

The structural characteristics of an embodiment of the present invention lies in that, as shown in FIG. 7, when the amplitude value corresponding to the symbol input to signal level converter 1 is calculated in signal level converter 1, in order to prevent the calculation amount of operating device 3 of the present invention from being increased, the space numbers corresponding to the amplitudes in the signal space are numbered in the order of or in the reverse order of the amplitude size instead of the amplitude value in the signal space shown in FIG. 2, and the space numbers are output.

Thus, the division operation required when the output signals B, C and D are generated by operating device 3 can be omitted, to reduce the amount of calculation and simplify the circuit.

Another structural characteristic of an embodiment of the present invention lies in that first inverter 5, first selector 6 and first amplifier 7 shown in FIG. 1 can be replaced by a single first multiplier 24 having two inputs. Here, the output of third pulse generator 23 is connected to one input of first multiplier 24 and the output signal B' is provided to the other input thereof, and the two input signals are multiplied.

Applying the same principle, second inverter 10, second selector 11 and second amplifier 12 shown in FIG. 1 can be replaced by a second multiplier 27. The output of fourth pulse generator 26 is connected to an input of second multiplier 27 and the output signal D' relevant to the output signal E is provided to the other input thereof, where the two input signals are multiplied. Accordingly, the first and second multipliers of FIG. 6 replace the corresponding constituents of FIG. 1, which eliminates the need for output signals C and E.

Another structural characteristic of an embodiment of the present invention lies in that $-(1-A)(1-\cos\{(2\pi t)/T\})$ instead of $0.5(1-A)(1-\cos\{(2\pi t)/T\})$ is used as a signal generated in fourth pulse generator 26 which acts as second pulse generator 9 of FIG. 1. As a result, the multiplication value of the output signal E originally provided as a gain control signal to amplifier 12 corresponding to second multiplier 27 of FIG. 6 can be replaced by the output signal D', to reduce circuit complexity. This is due to the following simplified expression.

$$E = 2 \times D \quad \ldots (8)$$

The embodiment of the present invention will be explained here in more detail with reference to FIGS. 3, 6 and 7, considering the above-described structure.

To facilitate understanding, the case of generating the baseband signal required for the four-level superposed modulated signal where the number of multi-levels is four, is explained as an example.

FIG. 7 is a linear graph for representing the operation of the processor shown in FIG. 6 wherein four amplitudes and space numbers expressed by the symbol when the number (M) of the multi-level is four. The portions particularly relevant to this embodiment of the present invention are marked B' and D' which are included in FIG. 3.

The NRZ data S1 input by two bits per one symbol period and the delayed data S2 which the NRZ data is delayed for one symbol cycle by data delayer 2 are input to signal level converter 1. Then, signal level converter 1 outputs the signals S11 and S12 converted to the signal levels required by operating device 3.

Here, the values of signals S11 and S12 equal the space numbers corresponding to the NRZ data in the signal space. That is, as shown in FIG. 7, the values of signals S11 and S12 are "1," "2," "3" and "4" and respectively correspond to the NRZ data "00," "01," "10" and "11."

The output signals S11 and S12 are provided to operating device 3 to produce output signals B' and D'. When the current input data is "11" and the previous symbol input data is "01," which is true at time axis 8 B5 of FIG. 3, the values of output signals S11 and S12 are "4" and "2," respectively. Therefore, the B' and D' outputs of operating device 3 are "2" (4-2) and "1" (4+2-(4+1)), respectively.

Here, the space numbers are used for the inputs of the above operation. However, the output values of B' and D' are the amplitude values in the signal space.

Accordingly, in first multiplier 24, since the output of third pulse generator 23 is multiplied by two, i.e., the current B' value, the value of two times $\cos\{(\pi t)/T\}$ is output and transmitted to fourth adder 25.

In fourth adder 25, the output signal of first multiplier 24 and the output signal D' provided by operating device 3 are summed. Since D's value is one, the amplitude of the output signal from second multiplier 27 is shifted to one voltage level.

Meanwhile, in second multiplier 27, the output of fourth pulse generator 26 is multiplied by one, i.e., the current value of D. Therefore, the signal $-(1-A)(1-\cos\{(1-2\pi t)/T\})$ is output and transmitted to fifth adder 28.

In fifth adder 28, the output signals of second multiplier 27 and fourth adder 25 are summed, to output the multi-level superposed amplitude-modulated baseband signal S10, i.e., the final output signal of the present invention.

By the above operation, the four-level superposed amplitude-modulated baseband signal, shown as S10 in FIG. 3, is output even in the next symbol cycle.

As described above, the present invention has an effect of providing a multi-level superposed amplitude-modulated baseband signal processor which maintains the bandwidth and power efficiencies, i.e., the basic characteristic of the multi-level superposed amplitude-modulated signal, by a simple structure wherein a baseband pulse is utilized in the minimum superposed amplitude modulation, having eliminated the drawback of the conventional method which requires all the pulse waveforms corresponding to each multi-level superposed modulated output signal.

It is another effect of the present invention to provide a multi-level superposed amplitude-modulated baseband signal processor which can provide a multi-level superposed amplitude-modulated baseband signal corresponding to the number of its multi-levels, by a simple change of the processor, when a change in the number of multi-levels is desired for better system flexibility.

The power spectrum is normalized when the multi-level superposed quadrature amplitude modulation signal obtained by using the multi-level superposed amplitude-modulated baseband signal of the present invention is amplified by an amplifier operating in a non-linear region. The normalized power spectrum of the present invention has good characteristics for narrower bandwidth and the re-growth phenomenon of the side-lobe occurs less as compared with the minimum shift keying (MSK) method or with the multi-level quadrature amplitude modulation (MQAM) method having a raised-cosine filter.

What is claimed is:

1. A multi-level superposed amplitude-modulated baseband signal processor, comprising:

data delaying means for receiving k-bit data, k being an integer, constituting one symbol, and for delaying said k-bit data for one symbol cycle and outputting one-symbol-delayed data;

signal level converting means for respectively receiving said k-bit data and said one-symbol-delayed data, converting said respectively received data into amplitude values selected among an amplitude set with a size of $2^k$ in a space of a multi-level superposed amplitude modulation signal expressed by said symbol, and outputting output signals S3 and S4, respectively, of the resultant amplitude values;

operating means for receiving the output signals of said signal level converting means and operating for one symbol cycle duration and producing output signals B, C, D, E and F defined as $$B = \frac{|S3 - S4|}{2}$$

$$C = sgn\ (S3 - S4)$$

$$D = \frac{S3 + S4}{2}$$

$$E = |S3 + S4|$$

$$F = sgn\ (S3 + S4)$$

wherein sgn(x) means sign of x and |y| means absolute value of y during the symbol cycle;

- a first pulse generator which repeatedly generates a cosine wave signal synchronized with a basic symbol clock of an input data stream and shaped as $\cos\{(\pi t)/T\}$, for a period (T) of the symbol cycle;
- first selecting means for receiving an output signal of said first pulse generator and an inversion of the output signal of said first pulse generator and selecting one of said received signals under control of said output signal C from said operating means as a first selected signal;
- a first amplifier for receiving and amplifying said first selected signal from said first selecting means, with a gain controlled by said output signal B from said operating means;
- a first adder for summing an output signal of said first amplifier and said output signal D from said operating means;
- a second pulse generator for repeatedly generating a cosine wave signal synchronized with the basic symbol clock of the input data stream and shaped as $0.5(1-A)(1-\cos\{(2\pi t)/T\})$, for the symbol cycle period (T) according to a degree (A) of superposition;
- second selecting means for receiving an output signal of said second pulse generator and an inversion of the output signal of said second pulse generator and selecting one of said received output signals under control of said output signal F from said operating means as a second selected signal;
- a second amplifier for amplifying said second selected signal from said second selecting means, with a gain controlled by said output signal E from said operating means; and
- a second adder for summing outputs of said first adder and said second amplifier to output a result as a superposed amplitude-modulated baseband signal.

2. A multi-level superposed amplitude-modulated baseband signal processor, comprising:

- data delaying means for receiving k-bit data, k being an integer, constituting one symbol, and for delaying said k-bit data for one symbol cycle and outputting one-symbol-delayed data;
- signal level converting means for respectively receiving said k-bit data and said one-symbol-delayed data, converting said respectively received data into space numbers selected among a space number set with a size of $2^k$ in a space of a multi-level superposed amplitude modulation signal expressed by said symbol, and outputting output signals S11 and S12, respectively;
- operating means for receiving the output signals of said signal level converting means and operating for one symbol cycle duration and outputting signals B' and D' defined as

B'=S11-S12

D'=(S13)-(M+1)

wherein M is a number of multi-levels during a relevant signal symbol cycle and S13 is a signal derived from S11 and S12;

- a first pulse generator which repeatedly generates a cosine wave signal synchronized with a basic symbol clock of the input data stream and shaped as $\cos\{(\pi t)/T\}$, for a period (T) of the symbol cycle;
- a first multiplier for multiplying the output signal of said first pulse generator and said signal B' and outputting a first result signal;
- a second pulse generator for repeatedly generating a cosine wave signal synchronized with the basic symbol clock of the input data stream and shaped as $(-(1-A)(1\cos\{(2\pi t)/T\} -(1-A)(1-\cos\{(2\pi t)/T\})$, for the symbol cycle period (T) according to a degree (A) of superposition;
- a second multiplier for multiplying an output signal of said second pulse generator and said signal D' and outputting a second result signal;
- a first adder for summing the first result signal of said first multiplier and said signal D' and outputting an added result; and
- a second adder for summing the second result signal of said second multiplier and said added result to output the multi-level superposed amplitude-modulated baseband signal.

3. A multi-level superposed modulated baseband signal processor according to claim 2, wherein said operating means comprises:

- a first subtracter for subtracting said signal S12 from said signal S11 and outputting said signal B';
- a third adder for summing said signal S11 and said signal S12 and outputting the signal S13 as a result; and
- a second subtracter for subtracting a value (M+1) from the output signal S13 of said third adder and outputting said signal D'.

* * * * *